US008140983B2

(12) United States Patent
Brantley et al.

(10) Patent No.: US 8,140,983 B2
(45) Date of Patent: Mar. 20, 2012

(54) SYSTEM AND METHOD FOR AUTO-GENERATING THREADS ON WEB FORUMS

(75) Inventors: Kimberly A. Brantley, Durham, NC (US); Ami H. Dewar, Durham, NC (US); Robert C. Leah, Cary, NC (US); John K. Muller, Orlando, FL (US)

(73) Assignee: International Business Machines Corporation, Armonk, NY (US)

( * ) Notice: Subject to any disclaimer, the term of this patent is extended or adjusted under 35 U.S.C. 154(b) by 1080 days.

(21) Appl. No.: 12/026,281

(22) Filed: Feb. 5, 2008

(65) Prior Publication Data
US 2009/0199103 A1 Aug. 6, 2009

(51) Int. Cl.
*G06F 3/048* (2006.01)
*G06F 3/00* (2006.01)
(52) U.S. Cl. ........ 715/759; 715/733; 715/736; 715/753; 715/758

(58) Field of Classification Search ................. 715/733, 715/736, 738, 744, 745, 753, 758, 759
See application file for complete search history.

(56) References Cited

U.S. PATENT DOCUMENTS

| 7,039,677 | B2* | 5/2006 | Fitzpatrick et al. | 709/204 |
|---|---|---|---|---|
| 2003/0212746 | A1* | 11/2003 | Fitzpatrick et al. | 709/206 |
| 2005/0198305 | A1* | 9/2005 | Pezaris et al. | 709/227 |
| 2007/0255791 | A1* | 11/2007 | Bodlaender et al. | 709/206 |
| 2008/0082607 | A1* | 4/2008 | Sastry et al. | 709/204 |
| 2008/0183834 | A1* | 7/2008 | Halcrow et al. | 709/207 |
| 2008/0184122 | A1* | 7/2008 | Grant et al. | 715/723 |
| 2008/0244438 | A1* | 10/2008 | Peters et al. | 715/772 |
| 2008/0294730 | A1* | 11/2008 | Oral et al. | 709/206 |

* cited by examiner

*Primary Examiner* — Nicholas Augustine
(74) *Attorney, Agent, or Firm* — Jeffrey T. Holman

(57) ABSTRACT

Methods and systems for auto-generating threads on web forums are described. Comments are received on web content contained on a web page within a web site, where the web site further includes a web forum. The comments can be monitored to determine if a comment threshold is reached, and a web content thread can be auto-generated in the web forum when the comment threshold is reached.

19 Claims, 5 Drawing Sheets

SYSTEM AND METHOD FOR AUTO-GENERATING THREADS ON WEB FORUMS

BACKGROUND OF THE INVENTION

Two major sources of traffic for web sites can be web content and web forums. Web content can include textual, visual, and/or aural content or artifacts contained on a web page within a web site. Examples of web content can include articles, blogs, videos, images, and sound files. In many conventional web sites, users may post comments on web content posted on the site. These comments can be textual messages, generally relating to the web content, and in some cases can be appended to the web content (e.g., on the bottom of the web page containing the web content, or on a separate page that is linked to from the web page with the web content).

Web forums can be web applications used for holding discussions and posting user-generated content. In some web sites, web forums can account for more than 50% of the total site traffic. The user-generated content ("posts") can be in the form of textual messages, videos, sound files, or web links, for example. Posts can be topically grouped into topic threads ("threads"), which in turn can be organized into a hierarchy (e.g., based upon the time the message is posted, or based upon subtopics). Threads can be used, for example, to address questions users have about the website or technical difficulties, and/or to discuss web content and related topics.

In conventional web forums, there generally is no methodology behind the creation of threads. Threads can be created by either a moderator or a member of the forum, and can relate to any topic the creator chooses. While this can result in a wide variety of threads, forum "clutter," where thread relating to topics of low community interest are comingled and outnumber threads containing topics of high community interest, can be a problem. Forum clutter can lead to inadequate community response to questions or problems, failure to resolve these issues, and reduced visibility and/or participation in threads. Because useful forum content can be crucial to forum participation, forum clutter can inhibit the effectiveness of a web forum.

Another problem resulting from the absence of a methodology for creating threads is that topics of high community interest can be overlooked altogether, due to user and/or moderator oversight or apathy. This can reduce the amount of useful forum content, and can thereby reduce forum participation.

BRIEF SUMMARY OF THE INVENTION

Methods and systems for auto-generating threads on web forums are described. Comments are received on web content contained on a web page within a web site, where the web site further includes a web forum. The comments can be monitored to determine if a comment threshold is reached, and a web content thread can be auto-generated in the web forum when the comment threshold is reached.

DETAILED DESCRIPTION OF THE INVENTION

Processes and systems for auto-generating threads on web forums are described. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Comments can be received on web content contained within a web site, where the web site can further include a web forum. The comments can be monitored to determine if a comment threshold is reached. When the comment threshold is reached, a web content thread can be auto-generated on the web forum, thereby permitting the web site to automatically facilitate relevant forum discussion threads on its web forum. By auto-generating of threads, a more user-centric design for forums can be enabled, as opposed to a moderator-centric design.

Figure 1:
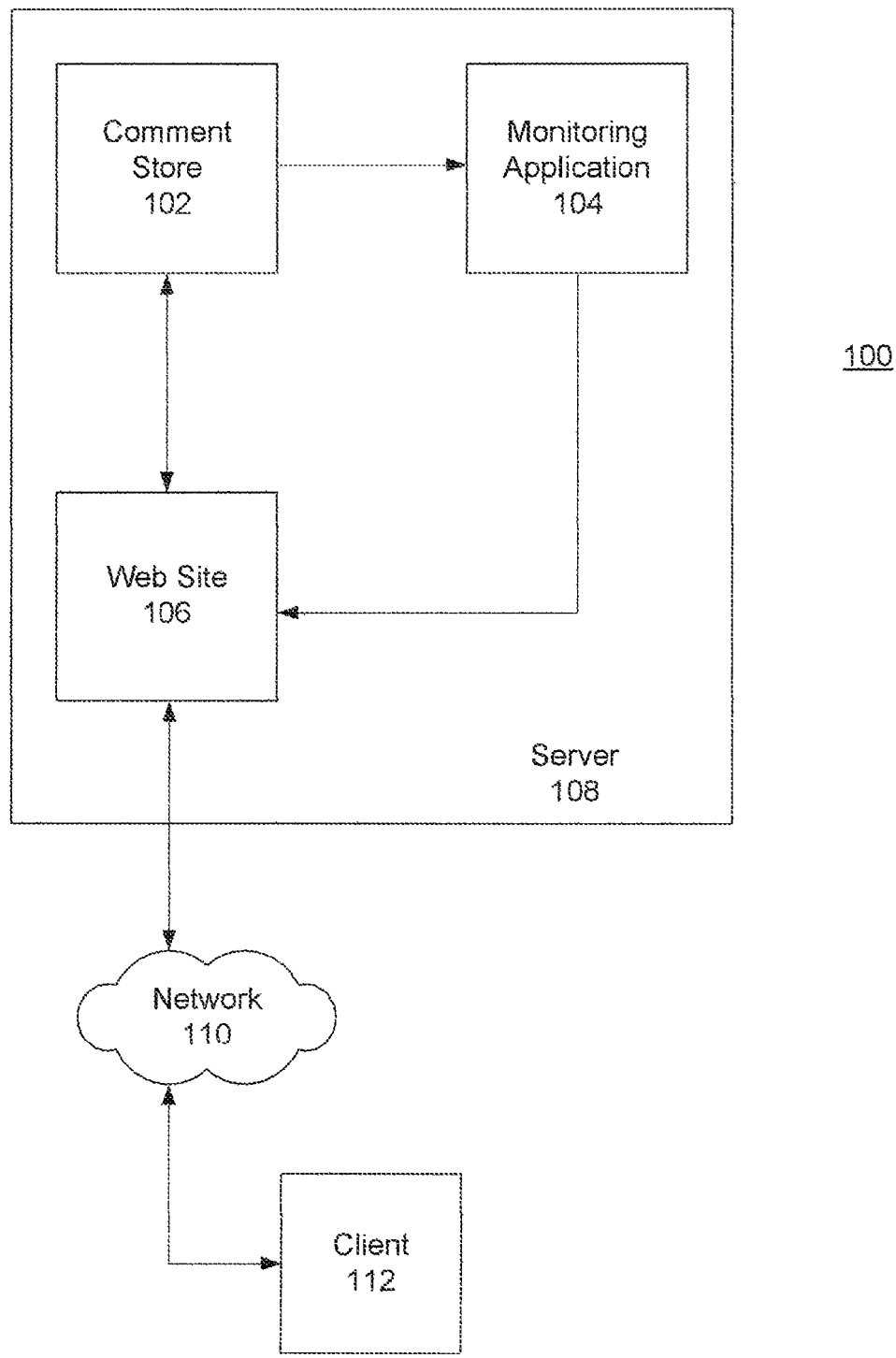
FIG. 1 illustrates an exemplary embodiment of a system for auto-generating threads on web forums.

FIG. 1 illustrates an exemplary embodiment of a system for auto-generating threads on web forums. System 100 can include server 108 and client 112, which are in communication through network connection 110. In one embodiment, the server 108 can include comment store 102, monitoring application 104, and web site 106. The web site 106 can include web content contained in web pages. In an exemplary embodiment, the web site 106 can include web pages that are dynamic, such as Java® Server Pages or Microsoft® Active Server Pages. The network connection 110 can convey data between the client 112 and the server 108, and can be any suitable wired or wireless connection.

The client 112 can be used by a user to interact with the web site 106. These interactions can include, but are not limited to, requesting and viewing web content and/or providing user-created content to the web site 106. The client 112 can be an internet browser in some embodiments. In an exemplary embodiment, the client 112 can be configured to allow a user to read and post comments on web content contained within the web site 106. Also, a user can post messages in a web forum contained within the web site 106 in an exemplary embodiment using the client 112. In an exemplary embodiment, the client 112 can be located on a client computer, which can be a computer system that is in a different location from the server 108 and can be configured to access the server 108.

The comment store 102 can store user comments on items of web content contained within the web site 106. The comment store 102 can in an exemplary embodiment be a database, and in another embodiment can be a file system.

The monitoring application 104 can monitor the comments stored in comment store 102 to determine if a comment threshold for a particular item of web content has been reached. The comment threshold can be a predetermined measure of a parameter indicating user and/or community interest in the item of web content. The comment threshold can be derived, for example, from at least one of the number of the comments, the number of unique users providing the comments, average time between the comments, the total word count of all of the comments, the average word count for each of the comments, the number of occurrences of certain keywords within the comments (e.g., based on keywords found within the metadata of the web content), the lapsed time between the posting of the two most recent comments, and characteristics of the comment text (e.g., punctuation, where the threshold can be met based upon occurrence of certain characters, such as question marks). The comment threshold can be based upon a predetermined level for any one parameter indicating interest, or can be based upon an algorithm that uses a combination of two or more parameters. Furthermore, the comment threshold can have one level for all web content on the web site, or can be customized by an editor to vary for each item of web content.

The monitoring application 104 can in some embodiments be a listener or observer object, or similar suitable application. The monitoring application 104 can be implemented in a dynamic web page format, such as Java® Server Pages or Microsoft® Active Server Pages, in an exemplary embodiment, and can also be implemented in any suitable servlet or applet. While the monitoring application 104 can be located on the server 108, as shown in FIG. 1, in another embodiment the monitoring application 104 can be stored on the same client computer as the client 112. The monitoring application 104 can be advantageous because it can be implemented on existing web forums and web content substantially without modifying the underlying web code.

When the monitoring application 104 determines that the comment threshold has been reached, the monitoring application 104 causes a web content thread to be auto-generated on the web forum of the web site 106. Auto-generation refers to generation of the thread without requiring a forum member or moderator to create the thread. By providing an auto-generated thread for the web content when user and/or community interest is at a level greater than or equal to the level indicated by the comment threshold, forum clutter can be reduced and the forum can be populated with more threads relating to topics of community interest. In an exemplary embodiment, the web content thread can be given the same title as the web content.

Figure 2:
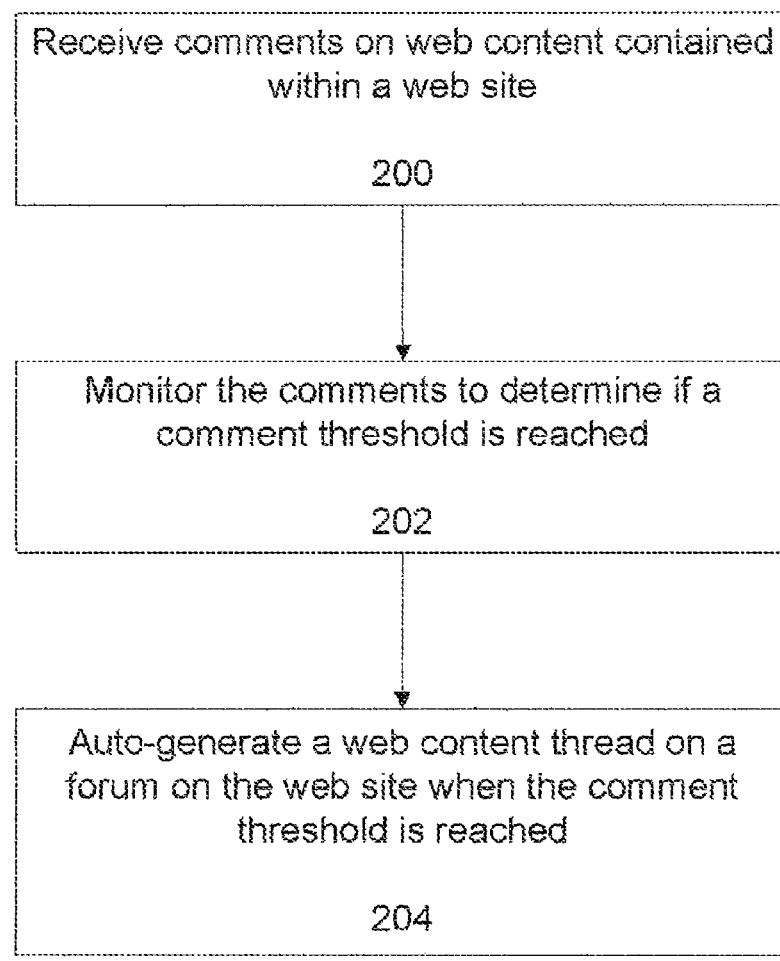
FIG. 2 illustrates an exemplary embodiment of a process for auto-generating threads on web forums.

FIG. 2 illustrates an exemplary embodiment of a process for auto-generating threads on web forums. The process depicted in FIG. 2 can be implemented by a server, such as server 108, in an exemplary embodiment. The process may begin by receiving comments on web content contained within a web site (step 200), wherein the web site further includes a web forum, as described hereinabove. The comments can be provided, for example, by a user using a client, as described hereinabove. The comments can be monitored to determine if a comment threshold is reached (step 202), as described hereinabove. Furthermore, a web content thread can be auto-generated on the web forum when the comment threshold is reached (step 204), as described hereinabove.

Figure 3:
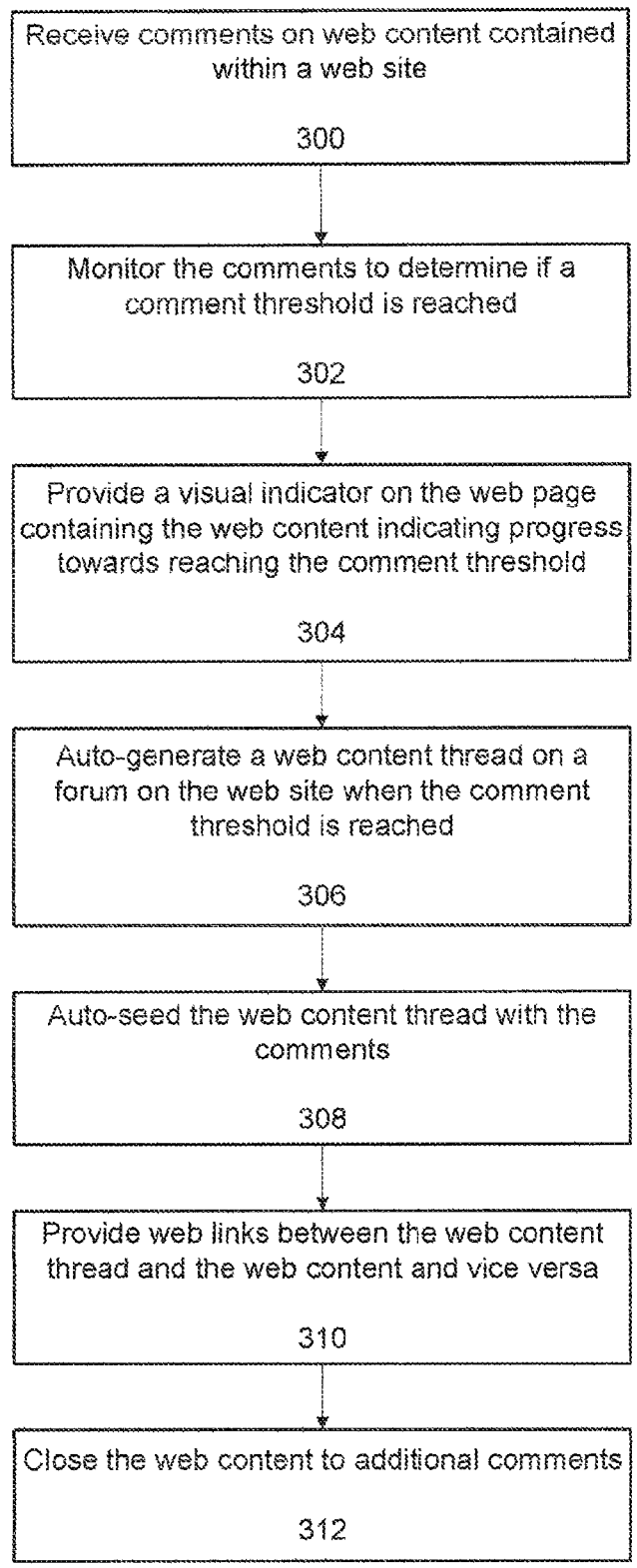
FIG. 3 illustrates another exemplary embodiment of a process for auto-generating and auto-seeding threads on web forums.

FIG. 3 illustrates another exemplary embodiment of a process for auto-generating and auto-seeding threads on web forums. The process depicted in FIG. 3 can be implemented by a server, such as server 108, in an exemplary embodiment. The process may begin by receiving comments on web content contained within a web site, wherein the web site further includes a web forum (step 300), as described hereinabove. The comments can be monitored to determine if a comment threshold is reached (step 302), as described hereinabove.

In certain embodiments, a visual indicator can be provided on the web page containing the web content indicating progress towards reaching the comment threshold (step 304). The visual indicator can indicate the level of interest in the web content to users. A visual indicator can be advantageous because users may be attracted to view and comment on web content when the visual indicator indicates a high level of interest (i.e., where the visual indicator indicates interest close to the comment threshold). In some embodiments, the visual indicator can be presented proximate to web links linking to the web content on other web pages within the web site. In an exemplary embodiment, the visual indicator is provided on the same web page as the web content when the comment threshold is reached, which can notify users that a web content thread exists on the web forum for the web content. In an exemplary embodiment, the visual indicator can include a web link to the web content thread when the comment threshold has been reached. In some exemplary embodiments, the visual indicator can be an icon indicating proximity to the comment threshold (e.g., a meter, a pie-graph, or other suitable icon).

A web content thread can be auto-generated in the web forum when the comment threshold is reached (step 306), as described hereinabove. In an exemplary embodiment, the web content thread can be auto-seeded with the comments (step 308). Auto-seeding refers to transferring a copy of the comments to the web content thread without requiring a forum member or moderator to transfer the comments. Auto-seeding the web content thread with the comments can be advantageous because visitors to the thread can be provided with the earlier discussion of the web content without being required to locate the comments on the web page containing the web content. In an exemplary embodiment, the comments can be auto-seeded as the first posts in the web content thread in the same order as presented on the web page containing the web content.

In some embodiments, users can subscribe to web content, meaning they can cause e-mails to be sent to their accounts when web content is posted on the web site. In an exemplary embodiment, users can be auto-subscribed to the web-content thread when it is auto-generated. This auto-subscription can be based upon user profile preferences, and can take the form of sending an e-mail to a user who viewed the web content, or alternatively when the user submitted a comment on the web content.

Web links can be provided between the web content thread and the web content and vice versa (step 310). That is, a web link can be provided on the web page containing the web content thread that links to the web content. The web link can be provided in the form of a post in the thread, or can be provided elsewhere on the same web page as the thread. In a preferred embodiment, the web link can be posted as a post (or "sticky") appearing at the top of each page of posts within the web content thread. Conversely, a web link can be provided on the web page containing the web content that links to the web content thread. Such embodiments can be advantageous because they can permit viewers of either the web content or the web content thread to easily access the other without being required to navigate through the web site.

The web content can be closed to additional commenting after the comment threshold is reached (step 312) in an exemplary embodiment. Such an embodiment can be advantageous because it prevents having discussions on the same web content from being located in two different locations on the web site, and can stimulate additional user activity and interaction.

Figure 4A:
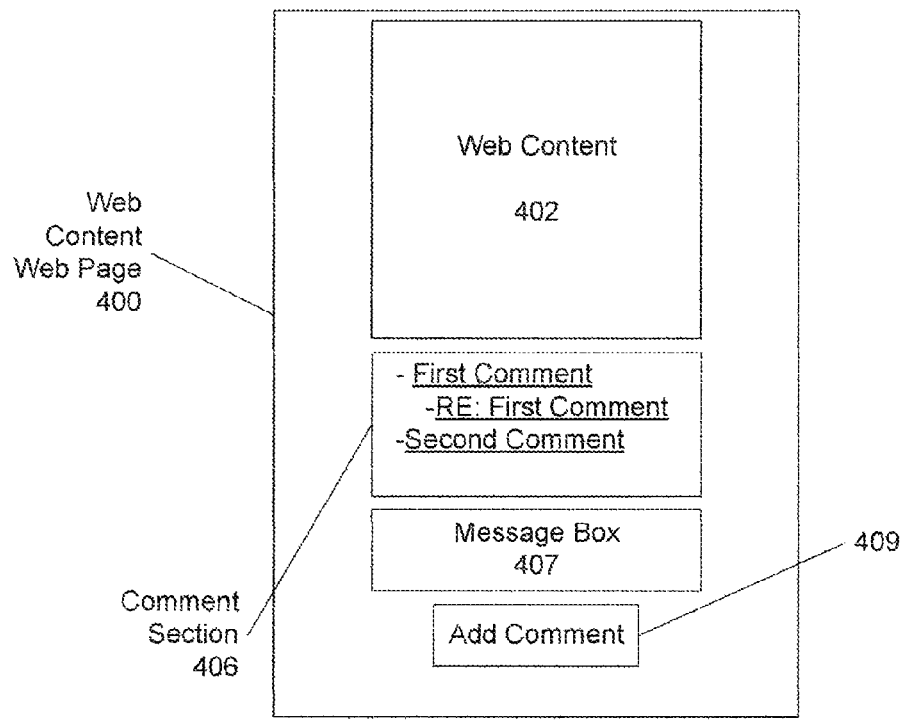
FIGS. 4A-4D illustrate exemplary embodiments of web pages on a display where auto-generation and auto-seeding of a web content thread on a web forum takes place.

FIGS. 4A-4D illustrate exemplary embodiments of web pages on a display where auto-generation and auto-seeding of a web content thread on a web forum takes place. FIG. 4A shows web content for which a thread can be auto-generated. Exemplary web content web page 400 includes web content 402, comment section 406, message box 407, and add comment button 409. The comment section 406 includes three comments: "First Comment," "RE: First Comment," and "Second Comment." "RE: First Comment" can be indented as shown to indicate that it is a response to "First Comment." The comments can be web links to the messages associated with each post. Users can post additional messages in message box 407 in an exemplary embodiment. When the message is complete, the user can select the add comment button 409 to add the user's message to comment section 406.

Figure 4B:
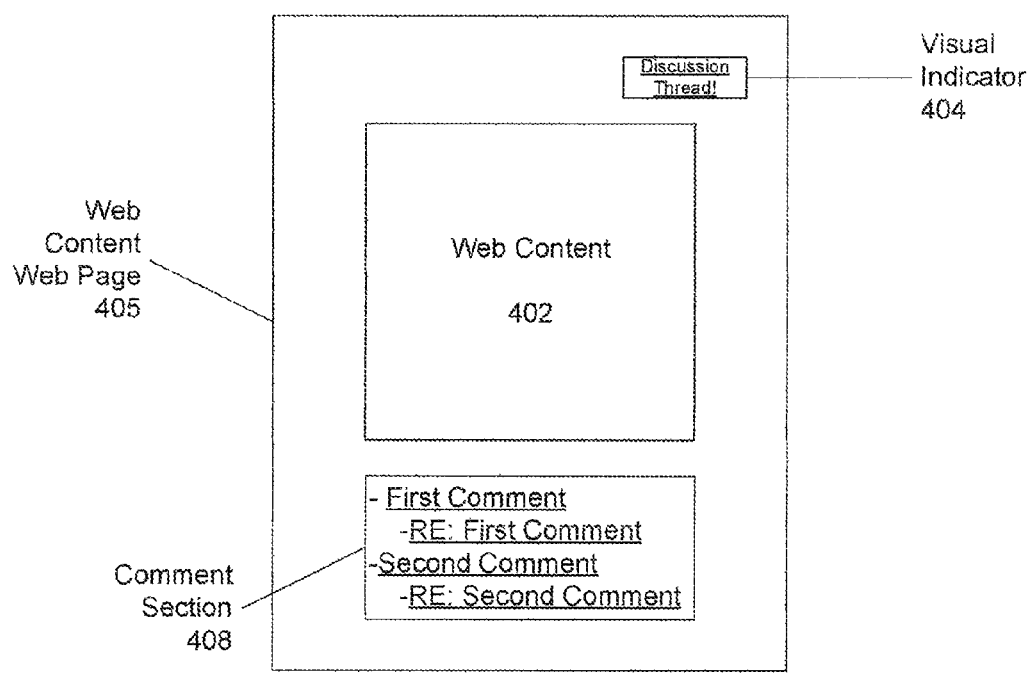

In an exemplary embodiment, the comment threshold can be four total comments. FIG. 4B shows web content web page 400 after the comment threshold has been reached. Exemplary web content web page 405 can include web content 402, visual indicator 404, and comment section 408. As shown in web content web page 405, the comment threshold has been reached because there are four total comments in the comment section 408: "First Comment," "RE: First Comment," "Second Comment," and "RE: Second Comment." Because the web content is closed to additional commenting after the comment threshold has been reached in the exemplary embodiment shown in web content web page 405, message box 407 and add comment button 409 have been removed. Visual indicator 404 can be provided on web content web page 405 to show that to users that the comment threshold has been reached. The visual indicator 404 can display the message "Discussion Thread!," thereby indicating to a user that a web content thread for web content 402 has been auto-generated in the web forum. In an exemplary embodiment, the visual indicator 404 can include a web link to the auto-generated web content thread.

Figure 4C:
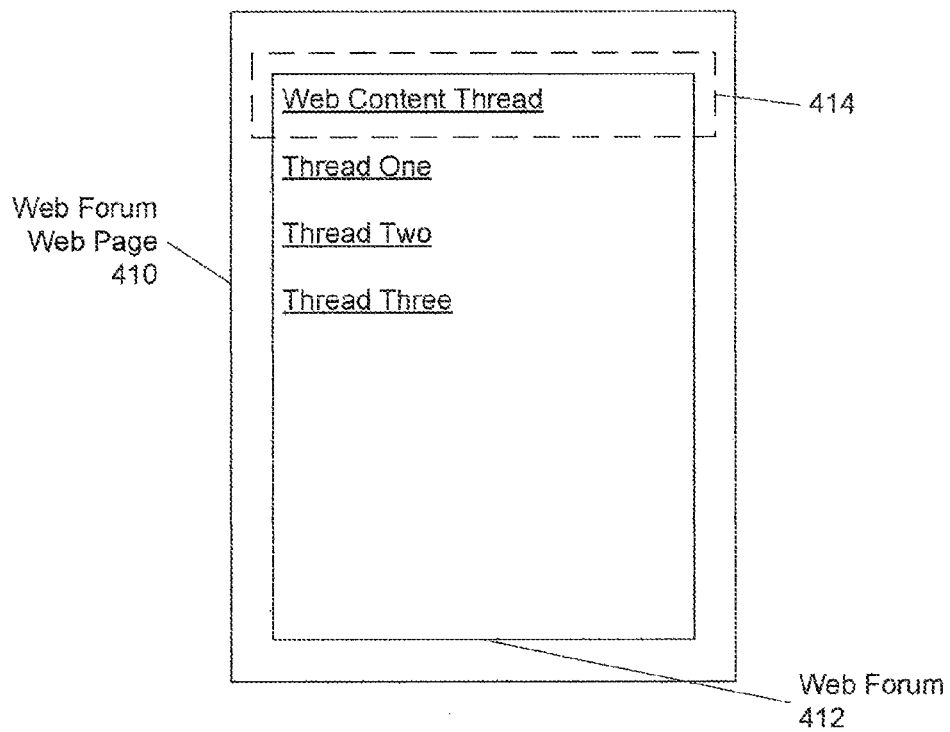

FIG. 4C shows exemplary web forum web page 410, which can include the web forum 412 for the web site containing web content web page 400. While no link is shown on web forum web page 410 linking to web content web page 400, in an alternative embodiment web forum web page 410 can contain a web link linking to web content web page 400. The web forum 412 can include a list of web links to all of the threads within the web forum 412. In an exemplary embodiment, the web links to the threads can be organized based upon the time of the most recent post in each thread. Web forum 412 includes four web links that link to threads, the threads being titled: Web Content Thread 414, "Thread One," "Thread Two," and "Thread Three." Web content thread web link 414 can link to the web content thread auto-generated for the web content 402 when the comment threshold is reached. In the example presented in the discussion of FIG. 4A, the web content thread web link 414 would be auto-generated in response to when the monitoring application 104 determines that the fourth comment "RE: Second Comment" was received.

Figure 4D:
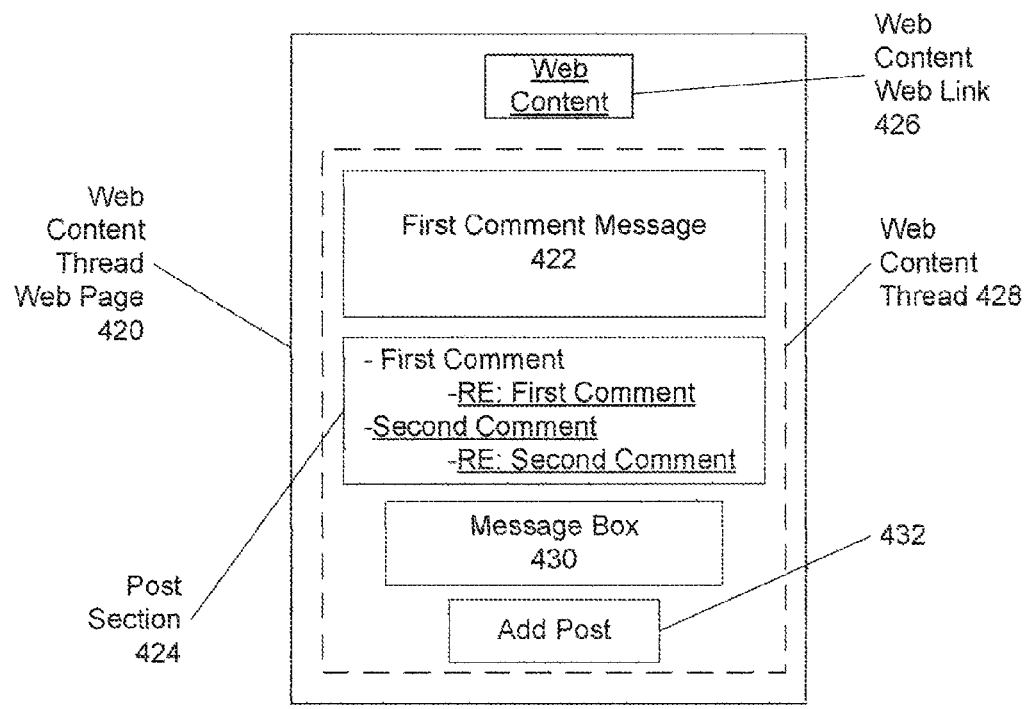

FIG. 4D shows an exemplary web content thread web page 420 containing web content thread 428. The web content thread 428 can be presented to a user, for example, when the user selects web content thread web link 414, and/or when the user selects a web link included within visual indicator 404. Web content thread 428 can contain the comments from comment section 406, which can be auto-seeded into web content thread 428 as shown in post section 424. Web content thread web page 420 can also include web content web link 426 linking to the web content 402. As stated hereinabove, in an alternative embodiment, web content web link 426 can be included in the web content thread 428 (e.g., as a post contained therein). First post message 422 can be displayed in expanded web content thread 428, and post section 424 can contain web links for remaining comments "RE: First Comment," "Second Comment," and "RE: Second Comment." Any subsequent posts can be appended as web links in post section 424. Furthermore, web content thread web page 420 can also include message box 430 and add post button 432, which can enable users to make additional posts in web content thread 428, in an exemplary embodiment.

In an exemplary embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is mainly described in terms of particular systems provided in particular implementations. However, one of ordinary skill in the art will readily recognize that this method and system will operate effectively in other implementations. For example, the systems, devices, and networks usable with the present invention can take a number of different forms. The present invention has also been described in the context of particular methods having certain steps. However, the method and system operate effectively for other methods having different and/or additional steps not inconsistent with the present invention.

A method and system for auto-generating threads on web forums has been disclosed. The present invention has been described in accordance with the embodiments shown, and one of ordinary skill in the art will readily recognize that there could be variations to the embodiments, and any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

We claim:

1. A method for auto-generating threads on web forums, comprising:
   receiving comments on web content contained on a web page within a web site, wherein the web site further comprises a web forum, the web site being stored on a server;
   monitoring the comments to determine if a comment threshold is reached, wherein the comment threshold indicates a level of interest;
   providing a visual indicator on the web page comprising the web content, the visual indicator indicating progress towards reaching the comment threshold; and
   auto-generating a web content thread in the web forum in response to the comment threshold being reached, wherein the visual indicator comprises a web link in response to the comment threshold being reached, the web link linking to the web content thread.

2. The method of claim 1 wherein the comment threshold is derived from at least one of the number of the comments, the number of unique users providing the comments, average time between the comments, the total word count of all of the comments, the average word count for each of the comments, the number of occurrences of certain keywords within the comments, the lapsed time between the posting of the two most recent comments, and characteristics of the comment text.

3. The method of claim 1 further comprising auto-seeding the web content thread with the comments.

4. The method of claim 1 further comprising providing a web link on the web page comprising the web content thread that links to the web content.

5. The method of claim 1 further comprising providing a web link on the web page comprising the web content that links to the web content thread.

6. The method of claim 1 further comprising closing the web content to additional commenting after the comment threshold is reached.

7. A system for auto-generating threads on web forums, comprising:
   at least one server, wherein the server comprises:
      at least one web site, wherein the at least one web site comprises web content contained on a web page, wherein the web content comprises comments, and a web forum, wherein the web site further comprises a visual indicator on the web page comprising the web content, the visual indicator indicating progress towards reaching a comment threshold; and
      a comment store configured to store the comments; and
   a monitoring application, wherein the monitoring application is configured to monitor the comments to determine if the comment threshold is reached and to auto-generate a web content thread in the web forum in response to the comment threshold being reached, wherein the comment threshold indicates a level of interest, wherein the visual indicator comprises a web link in response to the comment threshold being reached, the web link linking to the web content thread.

8. The system of claim 7 wherein the comment threshold is derived from at least one of the number of the comments, the number of unique users providing the comments, average time between the comments, the total word count of all of the comments, the average word count for each of the comments, the number of occurrences of certain keywords within the comments, the lapsed time between the posting of the two most recent comments, and characteristics of the comment text.

9. The system of claim 7 wherein the monitoring application is further configured to auto-seed the web content thread with the comments.

10. The system of claim 7 wherein the monitoring application is further configured to provide a web link on the web page comprising the web content thread that links to the web content.

11. The system of claim 7 wherein the monitoring application is further configured to provide a web link on the web page comprising the web content that links to the web content thread.

12. The system of claim 7 wherein the monitoring application is further configured to close the web content to additional commenting after the comment threshold is reached.

13. The system of claim 7 wherein the monitoring application is located on the server.

14. A program product stored on a non-transitory computer-readable medium comprising program instructions for auto-generating threads on web forums, the program instructions for:
   receiving comments on web content contained on a web page within a web site, wherein the web site further comprises a web forum;
   monitoring the comments to determine if a comment threshold is reached, wherein the comment threshold indicates a level of interest;
   providing a visual indicator on the web page comprising the web content, the visual indicator indicating progress towards reaching the comment threshold; and
   auto-generating a web content thread in the web forum in response to the comment threshold being reached, wherein the visual indicator comprises a web link in response to the comment threshold being reached, the web link linking to the web content thread.

15. The program product of claim 14 wherein the comment threshold is derived from at least one of the number of the comments, the number of unique users providing the comments, average time between the comments, the total word count of all of the comments, the average word count for each of the comments, the number of occurrences of certain keywords within the comments, the lapsed time between the posting of the two most recent comments, and characteristics of the comment text.

16. The program product of claim 14 further comprising program instructions for auto-seeding the web content thread with the comments.

17. The program product of claim 14 further comprising program instructions for providing a web link on the web page comprising the web content thread that links to the web content.

18. The program product of claim 14 further comprising program instructions for providing a web link on the web page comprising the web content that links to the web content thread.

19. The program product of claim 14 further comprising program instructions for closing the web content to additional commenting after the comment threshold is reached.

* * * * *